US012583773B2

(12) United States Patent
Reddy et al.

(10) Patent No.: US 12,583,773 B2
(45) Date of Patent: *Mar. 24, 2026

(54) ACID-DISPENSING SYSTEM FOR POOLS

(71) Applicant: Swim Sense, LLC, Pompano Beach, FL (US)

(72) Inventors: Rakesh Reddy, Boca Raton, FL (US); Kevin Doyle, Pompano Beach, FL (US)

(73) Assignee: Swim Sense LLC, Boca Raton, FL (US)

( * ) Notice: Subject to any disclaimer, the term of this patent is extended or adjusted under 35 U.S.C. 154(b) by 435 days.

This patent is subject to a terminal disclaimer.

(21) Appl. No.: 18/102,173

(22) Filed: Jan. 27, 2023

(65) Prior Publication Data

US 2024/0254022 A1     Aug. 1, 2024

(51) Int. Cl.
*C02F 1/50* (2023.01)
*B67D 7/62* (2010.01)
(Continued)

(52) U.S. Cl.
CPC ............... *C02F 1/685* (2013.01); *B67D 7/62* (2013.01); *C02F 1/50* (2013.01); *C02F 1/66* (2013.01);
(Continued)

(58) Field of Classification Search
CPC .... C02F 1/685; C02F 1/50; C02F 1/66; C02F 2103/42; C02F 2209/001; C02F 2209/42;
(Continued)

(56) References Cited

U.S. PATENT DOCUMENTS

| | | | |
|---|---|---|---|
| 2006/0168611 A1* | 7/2006 | Fima ..................... | F24H 15/212 |
| | | | 141/192 |
| 2015/0048032 A1* | 2/2015 | Rodriguez .............. | C02F 1/688 |
| | | | 210/96.1 |

(Continued)

FOREIGN PATENT DOCUMENTS

| | | | | |
|---|---|---|---|---|
| CH | 705616 A2 * | 4/2013 | ................ | C02F 1/66 |
| CN | 202446537 U * | 9/2012 | | |

(Continued)

OTHER PUBLICATIONS

English translation of patent publication CN202446537U, published Sep. 26, 2012. (Year: 2012).*

(Continued)

*Primary Examiner* — Joseph W Drodge
(74) *Attorney, Agent, or Firm* — Armon Shahdadi, Pierson Ferdinand LLP

(57) ABSTRACT

Examples described herein include systems and methods for improved acid-dispensing for pools. An example method can include drawing electrical current at the device through a low-power data channel to charge a battery. The example method can also include receiving at the device, through the data channel, a digital signal instructing the device to dispense acid. The digital signal can include an indication of an amount of acid to be dispensed by the acid-dispensing device. The acid-dispensing device can authenticate the digital signal and discharge acid based on the signal. For example, discharging acid can be performed by powering a (Continued)

pump using energy stored in the battery of the device. In some examples, the acid-dispensing device can confirm water flow to the pool before discharging acid.

20 Claims, 13 Drawing Sheets

(51) Int. Cl.

| | |
|---|---|
| *C02F 1/66* | (2023.01) |
| *C02F 1/68* | (2023.01) |
| *E04H 4/12* | (2006.01) |
| *C02F 103/42* | (2006.01) |

(52) U.S. Cl.
CPC ........ *E04H 4/1209* (2013.01); *C02F 2103/42* (2013.01); *C02F 2209/001* (2013.01); *C02F 2209/42* (2013.01); *C02F 2303/04* (2013.01); *C02F 2307/14* (2013.01)

(58) Field of Classification Search
CPC .. C02F 2303/04; C02F 2307/14; C02F 1/686; B67D 2210/0128; B67D 7/22; B67D 7/62; E04H 4/1209; F04B 49/02; F04B 49/06; F04D 15/00
See application file for complete search history.

(56) References Cited

U.S. PATENT DOCUMENTS

| | | | | |
|---|---|---|---|---|
| 2016/0299096 | A1* | 10/2016 | Greenwood | .............. C02F 1/66 |
| 2018/0112430 | A1* | 4/2018 | Shalon | ................. E04H 4/1281 |
| 2020/0135000 | A1* | 4/2020 | Asiri | .................... G08B 21/084 |
| 2021/0247785 | A1* | 8/2021 | Lewis | .................... C02F 1/008 |
| 2025/0003885 | A1* | 1/2025 | Kurani | ................ G01N 21/272 |

FOREIGN PATENT DOCUMENTS

| | | | | | |
|---|---|---|---|---|---|
| CN | 203589779 | U | * | 5/2014 | |
| JP | 2008086879 | A | * | 4/2008 | |
| WO | WO-2009105417 | A1 | * | 8/2009 | .............. E03D 1/01 |
| WO | WO-2018179493 | A1 | * | 10/2018 | ............ B01D 19/00 |

OTHER PUBLICATIONS

English translation of patent publication CH705616A2, published Apr. 15, 2013. (Year: 2013).*
English translation of patent publication CN203589779U, published May 7, 2014 (Year: 2014).*
English translation of patent publication JP2008086879A, published 2008. (Year: 2008).*

* cited by examiner

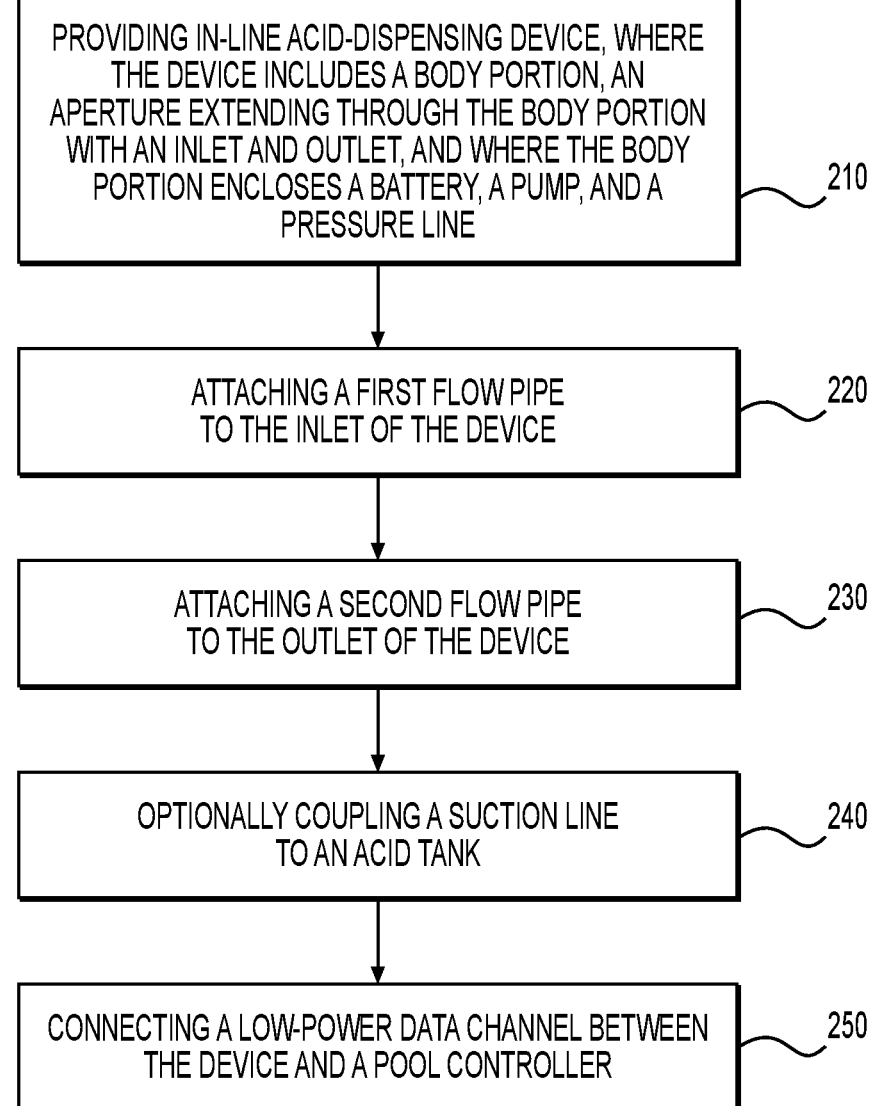

PROVIDING IN-LINE ACID-DISPENSING DEVICE, WHERE THE DEVICE INCLUDES A BODY PORTION, AN APERTURE EXTENDING THROUGH THE BODY PORTION WITH AN INLET AND OUTLET, AND WHERE THE BODY PORTION ENCLOSES A BATTERY, A PUMP, AND A PRESSURE LINE ⟶ 210

ATTACHING A FIRST FLOW PIPE TO THE INLET OF THE DEVICE ⟶ 220

ATTACHING A SECOND FLOW PIPE TO THE OUTLET OF THE DEVICE ⟶ 230

OPTIONALLY COUPLING A SUCTION LINE TO AN ACID TANK ⟶ 240

CONNECTING A LOW-POWER DATA CHANNEL BETWEEN THE DEVICE AND A POOL CONTROLLER ⟶ 250

ACID-DISPENSING SYSTEM FOR POOLS

BACKGROUND

Pools require appropriate levels of various chemicals in order to kill pathogens and maintain chemical balance. Pools are typically tested for some combination of pH, oxidation reduction potential ("ORP"), hardness, total alkalinity, salinity, stabilizer levels, and total and free chlorine. When pH levels rise beyond an acceptable level, acid can be added to the pool in order to modify the pH. This can be done by hand, such as by pouring acid directly into the pool, but this method carries safety risks to the user handling the acid and introduces human error into the process of maintaining a proper chemical balance.

Currently, acid-dispensing systems exist for providing a more automated approach to acid dispensing. These systems generally use a pool controller to monitor the acid requirements of the pool, such as by using pH and/or ORP probes, colorimeter sensors, or test strips, and then uses control logic to control a chlorinator or acid dispenser. These acid systems usually include a peristaltic pump for pumping the acid from a container into a flow of water. The pump, in turn, requires a power supply. As a result, these systems must be plugged into an outlet, such as a 120V outlet, or must receive a similar power level directly from the pool controller.

These existing systems include various drawbacks. First, they require installation of additional electrical outlets, or when a controller is being used, they require a controller with available electrical connections in the controller panel. This in turn requires more complex controller panels with more available connections. Second, these existing systems operate in an ON/OFF manner, meaning they are either receiving power and operating the pump, or they have no power and cannot perform any functions. This can be problematic because the acid-dispensing system has no built-in mechanisms to detect problems in the acid-dispensing process (such as an empty acid tank). Further, the controller cannot easily be updated to control the acid-dispensing system in a different manner-instead, the controller may need to be replaced or physically modified. These systems also suffer from long runs of pressure-side tubing, which is the tubing leading from the pump to the water flow that carries pressurized acid, and which is prone to failures. Worse still, when such a failure arises, neither the acid-dispensing unit or the controller may be aware of the problem.

As a result, a need exists for improved acid-dispensing systems that solve these problems. In particular, a need exists for acid-dispensing systems that do not require a full 120V connection, monitor conditions and detect failures, allow for simplified pool controllers that can be updated to control the acid-dispensing system differently through firmware updates, and minimize pressure-side tubing.

SUMMARY

Examples described herein include systems and methods for improved acid-dispensing for pools. For clarity, the term "pool" is intended to encompass pools, spas, and any other bodies of water that use at least one pump to circulate fluid. An example method can include dispensing acid from an acid-dispensing device. The method can include drawing electrical current at the device through a low-power data channel. This electrical current can be used to charge a battery associated with the device. The acid-dispensing device can limit the current draw to a threshold level suitable for a low-power data channel, thereby trickle-charging the battery without overloading the circuit.

The example method can also include receiving at the device, through the data channel, a digital signal instructing the device to dispense acid. The digital signal can be received directly from a pool controller, separate from the acid-dispensing device, without requiring a relay. The digital signal can include an indication of an amount of acid to be dispensed by the acid-dispensing device. The acid-dispensing device can authenticate the digital signal using an encryption key, such as a key pair.

The method can also include sending to the controller, using the lower-power data channel, an indication of a liquid level in an acid tank associated with the acid-dispensing device. This indication can be sent before and/or after receiving the digital signal from the pool controller.

The example method can also include discharging acid based on receiving the digital signal. For example, discharging acid can be performed by powering a pump using energy stored in the battery of the device. In some examples, the powering the pump includes operating a stepper motor, a brushed DC motor, or a brushless motor, including both geared or non-geared types of motors, using energy from the battery. In some examples, the acid-dispensing device can confirm water flow to the pool before discharging acid. As used herein, the term "water" is intended to encompass any liquid mixture taken from, or intended for, a pool, spa, or other body of water. That is, the term "water" is not intended to be limited to pure water.

The method can also include storing, in a memory storage of the acid-dispensing device, historical information indicating the amount of acid dispensed since the last refill of an acid tank associated with the acid-dispensing device. This information can be provided to the pool controller as needed. The method can also include detecting an error by the acid-dispensing device and alerting the controller by sending an alert over the data channel.

In another example, an in-line acid-dispensing device is disclosed herein. The device can include a body portion and an aperture extending through the body portion. The aperture can include an inlet configured to couple to a pipe and receive flowing water, and an outlet configured to couple to a pipe and dispense the water. The body portion can include various components, such as a battery configured to be charged from a low-power data channel, a pump powered by the battery, and a pressure line configured to carry acid from the pump to the aperture. In an example, the body portion also includes a check valve on the pressure line. The pressure line can lead to a nozzle attached to the pressure line and configured to dispense acid into the aperture.

The acid-dispensing device can also include a suction line extending from the body portion and configured to carry acid from an external acid tank to the dispensing device. In another example, the acid tank is internal to the acid-dispensing device, along with an internal suction line connecting the internal acid tank to the pump. In some examples, the acid-dispensing device includes a flow sensor configured to determine whether the aperture is flowing fluid.

The example in-line acid-dispensing device can be configured to receive a dispensing command on the low-power data channel and dispense acid to water flowing through the aperture. Similarly, the device can be configured to ignore a dispensing command based on determining that water is not flowing through the aperture at a sufficient rate. The in-line acid-dispensing device can also include a fluid-level sensor for determining a level of acid within an acid tank and can use information regarding the level of acid in determining whether to dispense acid.

The examples summarized above can each be incorporated into a non-transitory, computer-readable medium having instructions that, when executed by a processor associated with an acid-dispensing device, cause the processor to perform the stages described. Additionally, an acid-dispensing system is disclosed which is configured to perform one or more of the methods disclosed herein.

Both the foregoing general description and the following detailed description are exemplary and explanatory only and are not restrictive of the examples, as claimed.

BRIEF DESCRIPTION OF THE DRAWINGS

FIG. 2 is a flow chart of an example method for installing an acid-dispensing device.

DESCRIPTION OF THE EXAMPLES

Reference will now be made in detail to the present examples, including examples illustrated in the accompanying drawings.

Examples described herein include systems and methods for improved acid-dispensing for pools. An example method can include drawing electrical current at the device through a low-power data channel to charge a battery. The example method can also include receiving at the device, through the data channel, a digital signal instructing the device to dispense acid. The digital signal can include an indication of an amount of acid to be dispensed by the acid-dispensing device. The acid-dispensing device can authenticate the digital signal and discharge acid based on the signal. For example, discharging acid can be performed by powering a pump using energy stored in the battery of the device. In some examples, the acid-dispensing device can confirm water flow to the pool before discharging acid.

In other examples, an in-line acid-dispensing device and methods for installing the same are disclosed herein. The device can include a body portion and an aperture extending through the body portion. The aperture can include an inlet configured to couple to a pipe and receive flowing water, and an outlet configured to couple to a pipe and dispense the water. The body portion can include various components, such as a battery configured to be charged from a low-power data channel, a pump powered by the battery, and a pressure line configured to carry acid from the pump to the aperture. In an example, the body portion also includes a check valve on the pressure line. The pressure line can lead to a nozzle attached to the pressure line and configured to dispense acid into the aperture.

The acid-dispensing device can also include a suction line extending from the body portion and configured to carry acid from an external acid tank to the dispensing device. In another example, the acid tank is internal to the acid-dispensing device, along with an internal suction line connecting the internal acid tank to the pump. In some examples, the acid-dispensing device includes a flow sensor configured to determine whether the aperture is flowing fluid.

Figure 1:
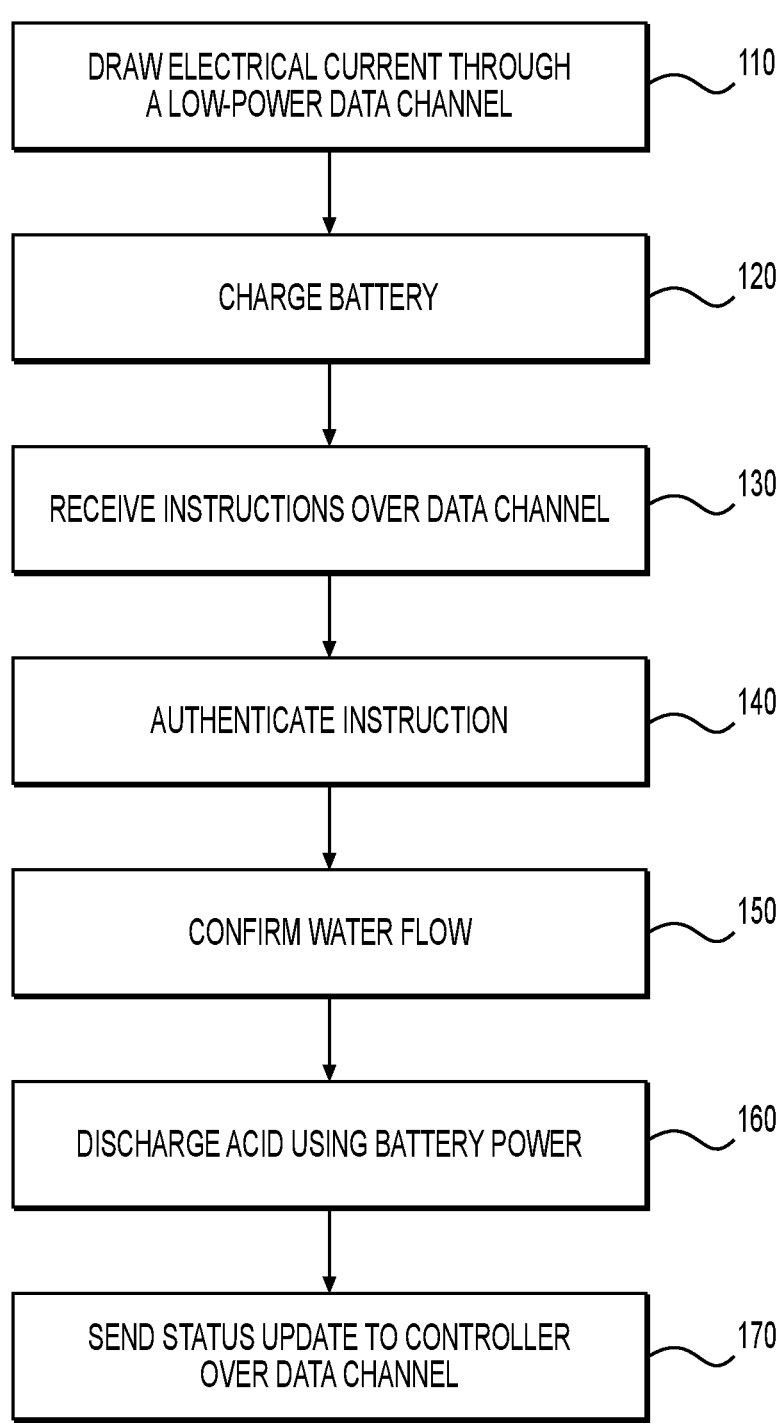
FIG. 1 is a flow chart of an example method for dispensing acid from an acid-dispensing device.

FIG. 1 is a flow chart of an example method for dispensing acid from an acid-dispensing device. At stage 110, an acid-dispensing device can draw electrical current through a low-power data channel (also referred to herein as a "data channel"). As used herein, the terms "low-power data channel" and "data channel" are intended to generally distinguish data channels from higher-voltage power lines. For example, a power cord plugged into a 120V outlet is not a low-power data channel, but a cable carrying data to or from a 12V-based controller is a low-power data channel. These examples are not intended to be limiting beyond generally distinguishing higher-voltage power-supply lines from data-channel lines. As another example, a channel using an electrical signaling standard such as RS-485 (also known as TIA-485 or EIA-485) or similar can be considered a low-power data channel.

The acid-dispensing device can draw power through the data channel. In some examples, the device can use a current limiting system to cap the current draw. For example, the device can include a current limiter that limits the current draw to 20 mA or 25 mA, or any other level suitable for the power source. In some examples, the power source is a controller operating according to one or more electrical standards that limit current draw.

At stage 120, the acid-dispensing device can use the current draw to charge a battery associated with the device. Although the current draw can be low, such as 20 mA or 25 mA, this draw is sufficient to trickle charge a battery such as a lithium-ion battery. The battery can then be used later to discharge larger power levels for short periods of times, trickle charging when necessary to retain an acceptable level of charge. For example, the acid-dispensing device can draw current from the data channel whenever the battery charge level is below a threshold level, such as 80%, 90%, 99%, or any other charge level.

Although various examples herein describe the use of a battery, such as a lithium-ion battery, other energy storage techniques can be used as well. For example, electricity can be stored in a capacitor, such as a supercapacitor, that can store and discharge energy on command.

At stage 130, the acid-dispensing device can receive an instruction over the data channel. For example, a pool controller can send a digital signal over the data channel. The signal can instruct the acid-dispensing device to dispense acid. In some examples, the signal provides an indication of an amount of acid to dispense. For example, the acid-dispensing device can dispense acid in cycles, where one cycle equates to a certain volume of acid such as 10 mL. If more acid is required, such as 100 mL, then the pool controller can instruct the acid-dispensing device to run 10 dispensing cycles.

In another example, the pool controller instructs the acid-dispensing device to pump acid for a particular amount of time. For example, if the acid-dispensing device is known to pump 2 mL/second, and 100 mL of acid is required by the controller, then the controller can instruct the acid-dispensing device to pump acid for 50 seconds. These numbers are exemplary and are merely chosen to further describe the examples provided.

In some examples, the acid-dispensing device can optionally perform one or more checks, confirmations, and/or authentications before dispensing acid. For example, at stage 140, the acid-dispensing device can authenticate the instruction received at stage 130. In one example, the acid-dispensing device stores a private key that can be used to authenticate a public key provided with the instruction. In another example, the acid-dispensing device and controller use a rotating digital key mechanism for authorization. Two-way communication can be required for authentication, thereby preventing a scenario where the controller becomes stuck in a loop that continuously instructs the device to dispense more acid. Stage 140 is optional and need not be performed in every example method.

Another optional check can be performed at stage 150, where the acid-dispensing device confirms water flow before dispensing acid. In some examples, confirming water flow can include receiving a signal from an external sensor or from the controller indicating that water is flowing through the pipe into which the acid will be dispensed. In another example, confirming water flow is performed using a sensor internal to the acid-dispensing device. This is particularly useful for an in-line acid-dispensing device that, as explained in more detail below, allows the water to flow through the device. In that example, a flow meter or pressure sensor can be used to estimate a flow rate.

In an example where, after receiving the instruction at stage 130, the acid-dispensing device determines at stage 150 that water is not flowing above a threshold level, the acid-dispensing device can cancel the operation and not dispense acid. In that example, the acid-dispensing device can skip to stage 170 and send a status update to the controller over the data channel, indicating that the operation was cancelled due to lack of sufficient water flow.

In another example where, after receiving the instruction at stage 130, the acid-dispensing device determines at stage 150 that water is not flowing above a threshold level, the acid-dispensing device can delay the operation until the device determines that water is flowing at a sufficient rate. For example, the acid-dispensing device can queue the dispensing instruction and periodically check the flow rate, such as by checking every minute. The device can cancel the operation after a certain number of checks or an amount of time has passed, such as one day. In that example, the acid-dispensing device can skip to stage 170 and send a status update to the controller over the data channel, indicating that the operation was cancelled due to lack of sufficient water flow.

Although not shown, another optional stage can include confirming a sufficient quantity of available acid before dispensing. This can be performed by receiving, through the data channel or directly from a fluid-level sensor, an indication of the amount of fluid available to the acid-dispensing device.

At stage 160, the acid-dispensing device can discharge acid using battery power. In some examples, as explained above, this stage is conditioned upon one or more requirements such as authenticating the instruction, confirming water flow, and/or confirming sufficient available acid. However, these preconditions are not required in all examples. Stage 160 can include operating a pump and/or a stepper motor to pull acid through a suction tube and into a pressurized tube. Power for operating the pump and stepper motor can come entirely from the battery that was charged at stage 120. In some examples, the battery voltage may need to be boosted or converted to be used by the motor of the pump. For example, the pump can rely on a motor driver that operates at 12V, but the battery voltage might be lower, such as 3.7V. In that example, the battery voltage is boosted from 3.7V to 12V to properly power the motor driver and operate the pump. This battery voltage boost can be enabled or disabled by the controller.

In additional, the electronic components of the device can include a switch or relay configured to disconnect the battery from the circuit when the low-power data channel is not powered. This can prevent the battery from discharging into the circuit when the circuit is not powered on, which can occur during shipping or storage. This also maintains the battery's charge such that it is immediately ready to operate when the data channel is connected to the device and powered.

In some examples, the low-power data channel can support battery voltage reporting. When the battery's voltage drops below a threshold, this condition can trigger an error that is communicated over the data channel. The error can persist until the battery charge is raised above the threshold.

The pressurized tubing can interface with a check valve that prevents any fluid from flowing back toward the pump. The acid-dispensing device can dispense the acid directly into the water flow in some examples. In other examples, the device dispenses the acid into a mixing tank that more gradually mixes the acid into the water flow, as described in more detail with respect to later embodiments herein.

At stage 170 the acid-dispensing device can send a status update to the pool controller over the low-power data channel. The status update can include an indication of how much acid was dispensed, such as by indicating that the pump ran for a particular number of cycles or for a certain amount of time, or that a specific volume of acid was dispensed. Stage 170 can also include information indicating a battery level of the acid-dispensing device and/or an acid level of an acid tank. And as mentioned above, stage 170 can also include an indication that an acid-dispensing operation was paused, cancelled, or otherwise interrupted, if applicable under the circumstances.

FIG. 2 is a flow chart of an example method for installing an acid-dispensing device. At stage 210 of the method, an in-line acid-dispensing device can be provided. An example of an in-line acid-dispensing device is depicted in FIGS. 5-12 and further described in the corresponding description sections herein. The in-line acid-dispensing device can include a body portion and an aperture extending through the body portion. The aperture can be sized with an inner diameter that approximately matches the inner diameter of a pipe, such as a main water line, that carries water from a pool pump back to the pool. The aperture can include an inlet and an outlet for attaching the device "in line" with the water line, such that the flowing water travels through the aperture of the device.

The body portion can also include a battery, an acid pump, and a pressure line. The battery can be a lithium-ion battery, for example, or any other suitable type of battery. As explained with respect to FIG. 1, the battery can be trickle charged by drawing current through a low-power data channel. The battery can be configured to power all operations of the in-line acid-dispensing device. In an example, the body portion of the device fully encloses the battery, protecting it from the elements and reducing wiring.

The body portion can also enclose the acid pump, which in turn can be powered by the battery. The acid pump can include an inlet connected to a suction tube, where the suction tube is routed to an acid tank. That acid tank can be within the body portion in some examples, but in other examples the acid tank is located outside of and separate from the in-line acid-dispensing device. The suction line can therefore run from the acid tank to the acid pump inlet. The outlet of the acid tank can connect to a pressure tube that carries the acid from the pump to the water flow. In some examples, the pressure tube includes a check valve to ensure that fluid flows in only one direction through the pressure tube. The check valve can be located within the body portion of the in-line acid-dispensing device as well, in an example.

Stage 220 of the example method can include attaching a first flow pipe to the inlet of the device. For example, the inlet of the aperture can be shaped to couple to a main water line. In some examples, this can include inserting a pipe of the main water line into the inlet and securing it in place. Securing it in place can include applying sealant in an example. It can also include tightening a fastener, such as a cap with internal threading that mates with external threading on the inlet. In some examples, the method includes cutting an existing pipe, sliding a fastener over one end of the pipe, and then attaching the pipe to the inlet using the fastener.

Stage 230 of the example method can include attaching a second flow pipe to the inlet of the device. As with the inlet described above, the outlet of the aperture can be shaped to couple to a main water line. In some examples, this can include inserting a pipe of the main water line into the inlet and securing it in place. Securing it in place can include applying sealant in an example. It can also include tightening a fastener, such as a cap with internal threading that mates with external threading on the inlet. In some examples, the method includes cutting an existing pipe, sliding a fastener over one end of the pipe, and then attaching the pipe to the inlet using the fastener. Although the flow pipes are described as "first" and "second" pipes, in some examples they begin this example method as a single pipe that is cut to make two portions of pipe, with each pipe connected to the inlet and outlet, respectively.

Stage 240 can include optionally coupling a suction line to an acid tank. This stage can be considered optional because, in some embodiments, the acid tank can be retained within the in-line acid-dispensing device. For example, the acid tank can be removable such that a user can remove the tank to refill it when empty. In another example, the in-line acid-dispensing device can include a filling tube that a user can access to pour acid into the internal acid tank. However, in embodiments where the acid tank is external to the in-line acid-dispensing device, then at stage 240, an installing user can attach a suction line to an external acid tank. The suction line can be coupled to one or more fittings on or in the in-line acid-dispensing device in order to direct the acid from the external tank to the acid pump inside the dispensing device.

Stage 250 can include connecting a low-power data channel between the device and a pool controller. For example, the in-line acid-dispensing device can include one or more ports configured to accept one or more types of data cables, such as a USB, CAT5, IDE/EIDE, SATA, DVI, HDMI, or VGA cable, although any type of data cable could be used at this stage of the method. This stage can also include connecting the data channel to the pool controller at the other end.

Figure 3:
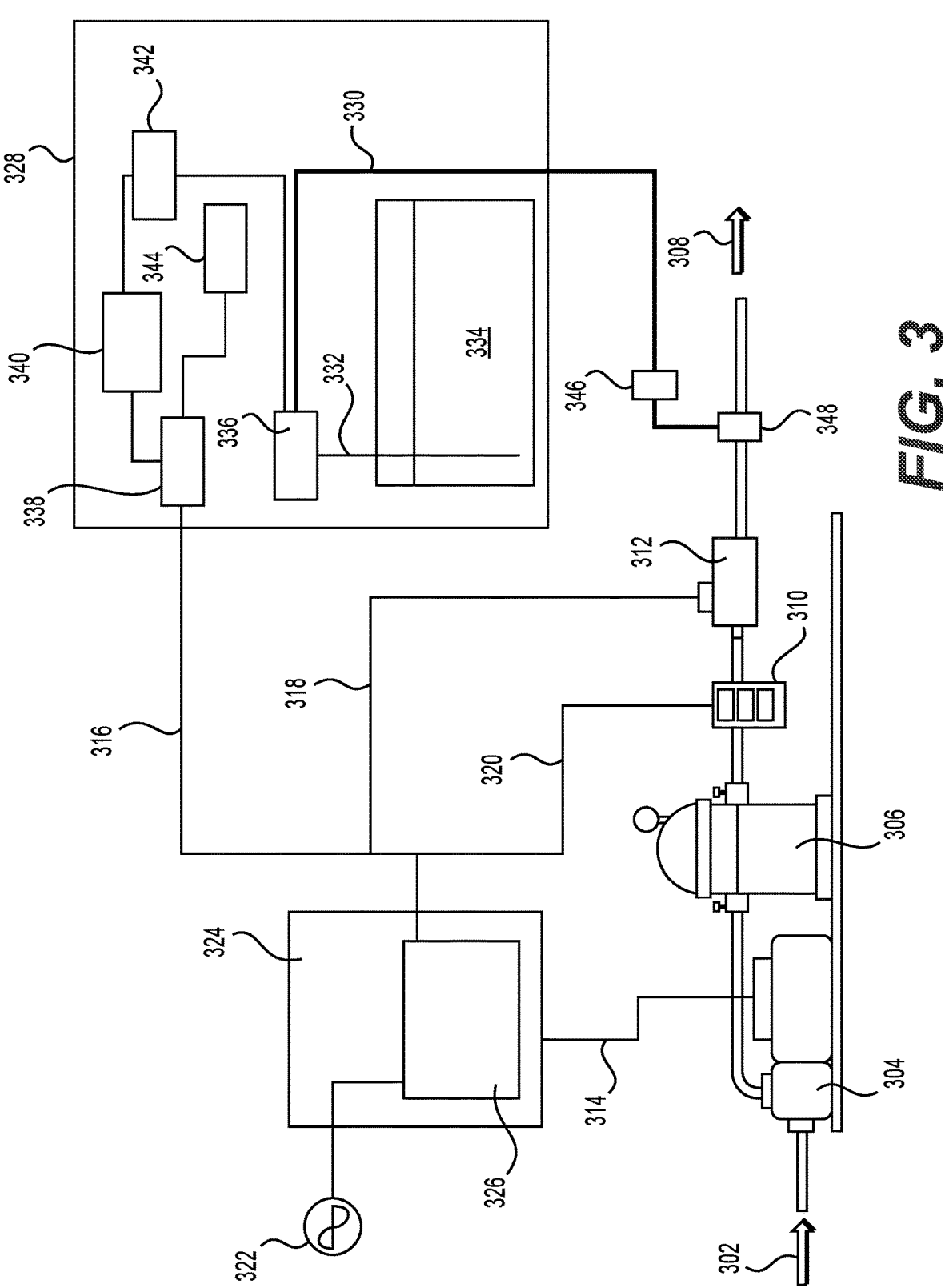
FIG. 3 is a schematic of a system for dispensing acid from an acid-dispensing device to a pool utilizing a low-power data channel.

FIG. 3 is a schematic of a system for dispensing acid from an acid-dispensing device to a pool utilizing a low-power data channel. The example of FIG. 3 shows water flowing through various components associated with a pool. The water flow includes an incoming flow 302 and an outgoing flow 308, collectively referred to herein as the water flow, main flow, or main line. As shown the incoming flow 302 is pulled into a pool pump 304 that drives the water flow through the system. The pump 304 pressurizes the incoming water and pumps it to the next component, which in this example is a pool filter 306.

Pool pumps 304 can require high levels of current while operating. In this example, the pump is powered through a pool controller 324. The pool controller 324, also referred to as a fluid system panel or simply a panel, can manage fluid operations for one or more bodies of water. For example, the pool controller 324 can initiate, monitor, and control functions of various components associated with the fluid system. The pool controller 324 can be powered from a traditional power source 322, such as a 120V or 240V power outlet. The pool controller 324 can also include a pool controller processor 326 that is configured to execute instructions stored on a non-transitory, computer-readable medium.

In the example of FIG. 3, the pool pump 304 is powered by the pool controller 324 via a power cable 314. In other examples, however, the pool pump 304 can be powered directly from the power source and the pool controller 324 can control the pump 304 through a data cable or wireless connection that provides digital instructions for the pump 304 to turn on or off.

The pool pump 304 can push the water flow through various components on the way back to the pool. For example, the water flow can travel through a standalone pH/ORP monitor 310. The pH/ORP monitor 310 can test the water flow and measure both pH and ORP levels. The pH/ORP monitor 310 can then send a communication to the pool controller 324 regarding the measurements. For example, the pH/ORP monitor 310 can send a digital signal on a communication channel 320 to the pool controller 324. The communication channel 320 can interface with a communication bus, such as a RS-485-based panel of the pool controller 324. In some examples, the pH/ORP monitor 310 can be powered by that same communication channel 320. As used herein, the terms "data channel" and "communication channel" are intended to be synonymous.

The water flow can also travel through a chlorinator cell 312. The chlorinator cell 312 may include a plurality of blades and terminals or other types of connectors that apply an electric differential across the blades. The electric differential can cause a chemical reaction between the blades and water, generating chlorine that enters the water flow as it continues through the system. As with the pH/ORP monitor 310, the chlorinator cell 312 can send a digital signal on a communication channel 318 to the pool controller 324. The communication channel 318 can interface with a communication bus, such as a RS-485-based panel of the pool controller 324. In some examples, the chlorinator cell 312 can be powered by that same communication channel 318.

The water flow from the chlorinator cell 312 can then travel through an acid-dispensing coupling 348, as shown in FIG. 3, or through an in-line acid-dispensing device as described through FIGS. 4-12. In the example of FIG. 3, the acid-dispensing coupling 348 is associated with an acid-dispensing device 328. The acid-dispensing device 328 can be powered by a communication channel 316 from the pool controller 324. As described with respect to communication channels 318 and 320, the communication channel 316 can interface with a communication bus, such as a RS-485-based panel of the pool controller 324. The acid-dispensing device 328 can also send and receive digital communications over the communication channel 316. In FIG. 3, communication channels 316, 318, and 320 are shown connecting to one another before connecting to the pool controller 324. However, this representation is merely used to indicate that all three communication channels 316, 318, 320 can be connected to the same panel of the pool controller 324. For example, the panel can include at least 3 interfaces for communication cables.

The acid-dispensing device 328 can include a battery 340 and a current limiter 338 for a battery charging circuit. The acid-dispensing device 328 can draw current through the communication channel 316, while the current limiter 338 can cap the current at a level suitable for the pool controller 324. Example current caps include 20 mA and 25 mA, for example. In some examples, the acid-dispensing device 328 can be configured to allow for a custom cap on the current draw. This current can be used to charge the battery 340, which can be a lithium-ion battery or any other suitable battery.

The power drawn through the current limiter 338 can also be used to power or otherwise communicate with a microcontroller 344. The microcontroller 344 can include a processor configured to execute instructions stored in a non-transitory, computer-readable medium. In one example the microcontroller 344 is primarily powered by the battery 340, but in a scenario where the battery 340 is depleted, the microcontroller 344 can be powered directly from the current drawn through the current limiter 338. The microcontroller 344 can also receive digital signals sent from the pool controller 324 over the communication channel 316. The processor of the microcontroller 344 can be configured to interpret these signals as well as send signals back to the pool controller using the same communication channel 316.

The battery 340 can power a motor driver 342, which can act as an interface between the control circuitry of the acid-dispensing device 328 and an acid pump 336 associated with the device 328. The motor driver 342 can receive a low-current control signal, such as a signal from the microcontroller 344, and transform it into a higher-current signal capable of driving the acid pump 336. The motor driver 342 can utilized stored energy within the battery 340 to provide sufficient power to drive the acid pump 336. When the motor driver 342 has completed an operation, it can remain idle while the battery 340 is trickle charged through the communication channel 316.

The acid pump 336 can interface with at least two lines, also referred to as tubes, configured to carry acid to or from the acid pump 336. In an example, the acid pump 336 includes two fittings, each fitting configured to couple with an acid line. As shown in FIG. 3, one of these acid lines can be a suction line 332 that runs from an acid tank 334 to the acid pump 336. In this example, the acid tank 334 is located within the acid-dispensing device 328, but as explained further with respect to other embodiments described herein, the acid tank 334 can be located externally to the acid-dispensing device 328 and the suction line 332 can run from the external acid tank 334 to the acid pump 336.

The other acid line associated with the acid pump 336 can be a pressure line 330 that carries acid pressurized by the acid pump 336. In this example, the pressure line 330 runs from the internal acid pump 336 to an external check valve 346. The check valve 346 is configured to allow fluid to flow in only direction, ensuring that water from the main water flow does not enter the acid-dispensing system. The check valve 346 can provide the acid to an acid-dispensing coupling 348 installed on a pipe carrying the water flow 308 to the pool. In some examples, the check valve 346 and acid-dispensing coupling 348 are combined into a single unit. In other examples, such as that shown in FIG. 3, another line carries acid from the check valve 346 to the acid-dispensing coupling 348.

In the example of FIG. 3, the acid-dispensing device 328 can operate entirely off power received through the low-voltage data channel 316. This eliminates the need for a separate connection to a high-voltage power source, allowing for a simplified pool controller 324 that can be updated to control the acid-dispensing system differently through firmware updates. Additionally, the acid-dispensing device 328 can monitor conditions and detect failures and communicate the same to the pool controller 324.

Figure 4:
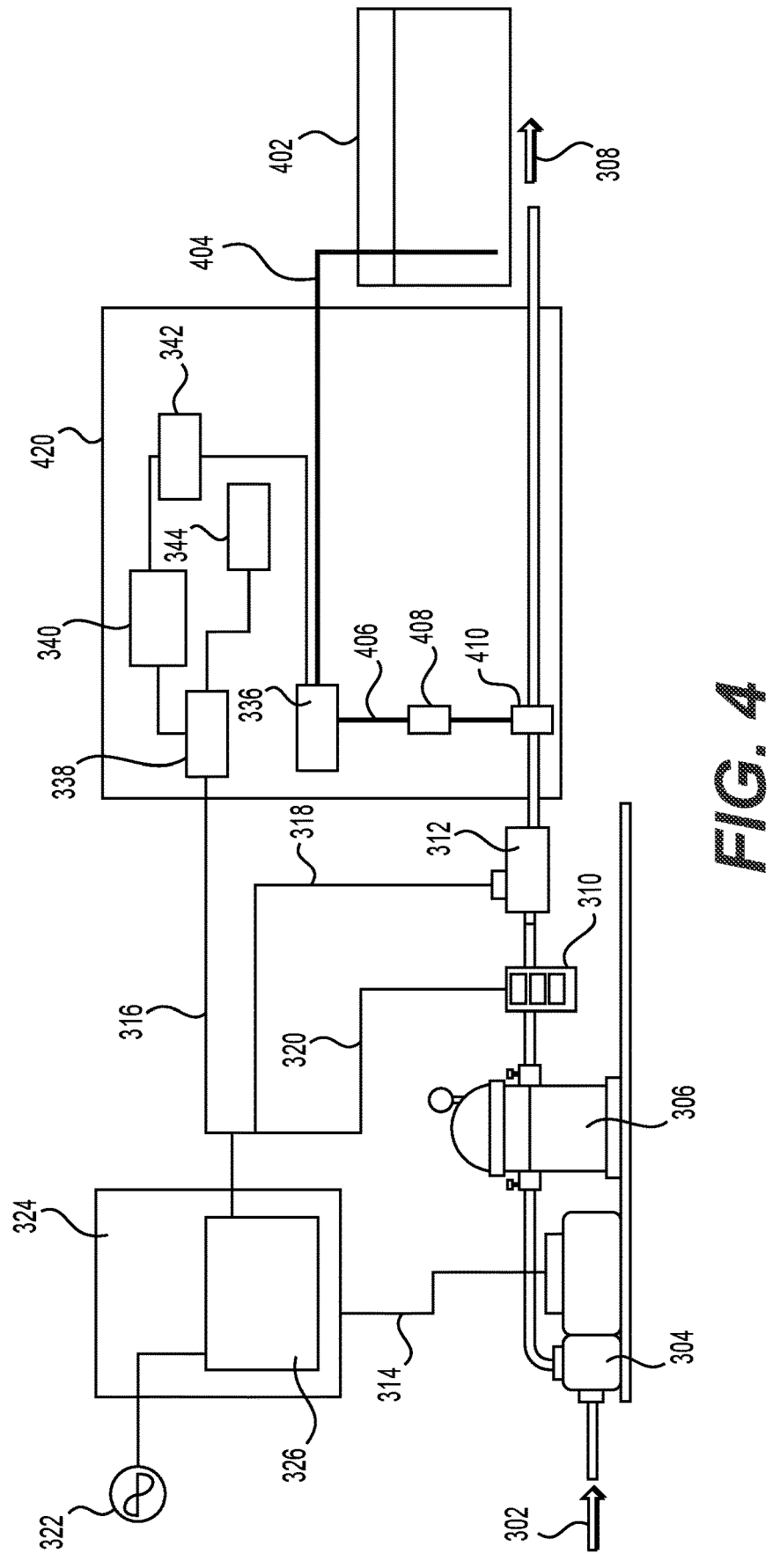
FIG. 4 is a schematic of a system for dispensing acid from an in-line acid-dispensing device to a pool utilizing a low-power data channel.

FIG. 4 is a schematic of a system for dispensing acid from an in-line acid-dispensing device to a pool utilizing a low-power data channel. Several of the components of FIG. 4 are similar or identical to those in FIG. 3, but their descriptions are repeated here for completeness.

The example of FIG. 4 shows water flowing through various components associated with a pool. The water flow includes an incoming flow 302 and an outgoing flow 308, collectively referred to herein as the water flow, main flow, or main line. As shown the incoming flow 302 is pulled into a pool pump 304 that drives the water flow through the system. The pump 304 pressurizes the incoming water and pumps it to the next component, which in this example is a pool filter 306.

Pool pumps 304 can require high levels of current while operating. In this example, the pump is powered through a pool controller 324. The pool controller 324, also referred to as a fluid system panel or simply a panel, can manage fluid operations for one or more bodies of water. For example, the pool controller 324 can initiate, monitor, and control functions of various components associated with the fluid system. The pool controller 324 can be powered from a traditional power source 322, such as a 120V or 240V power outlet. The pool controller 324 can also include a pool controller processor 326 that is configured to execute instructions stored on a non-transitory, computer-readable medium.

In the example of FIG. 4, the pool pump 304 is powered by the pool controller 324 via a power cable 314. In other examples, however, the pool pump 304 can be powered directly from the power source and the pool controller 324 can control the pump 304 through a data cable or wireless connection that provides digital instructions for the pump 304 to turn on or off.

The pool pump 304 can push the water flow through various components on the way back to the pool. For example, the water flow can travel through a standalone pH/ORP monitor 310. The pH/ORP monitor 310 can test the water flow and measure both pH and ORP levels. The pH/ORP monitor 310 can then send a communication to the pool controller 324 regarding the measurements. For example, the pH/ORP monitor 310 can send a digital signal on a communication channel 320 to the pool controller 324. The communication channel 320 can interface with a communication bus, such as a RS-485-based panel of the pool controller 324. In some examples, the pH/ORP monitor 310 can be powered by that same communication channel 320.

The water flow can also travel through a chlorinator cell 312. The chlorinator cell 312 may include a plurality of blades and terminals or other types of connectors that apply an electric differential across the blades. The electric differential can cause a chemical reaction between the blades and water, generating chlorine that enters the water flow as it continues through the system. As with the pH/ORP monitor 310, the chlorinator cell 312 can send a digital signal on a communication channel 318 to the pool controller 324. The communication channel 318 can interface with a communication bus, such as a RS-485-based panel of the pool controller 324. In some examples, the chlorinator cell 312 can be powered by that same communication channel 318.

The water flow from the chlorinator cell 312 can then travel through an in-line acid-dispensing device 420. As shown in FIG. 4, the in-line acid-dispensing device 420 is installed directly on the main water line, such that the outgoing flow 308 runs through the device 420 itself. The in-line acid-dispensing device 420 can be powered by a communication channel 316 from the pool controller 324. As described with respect to communication channels 318 and 320, the communication channel 316 can interface with a communication bus, such as a RS-485-based panel of the pool controller 324. The in-line acid-dispensing device 420 can also send and receive digital communications over the communication channel 316. In FIG. 4, communication channels 316, 318, and 320 are shown connecting to one another at various points before connecting to the pool controller 324. However, this representation is merely used to indicate that all three communication channels 316, 318, 320 can be connected to the same panel of the pool controller 324. For example, the panel can include at least 3 interfaces for communication cables.

The in-line acid-dispensing device 420 can include a battery 340 and a current limiter 338 for a battery charging circuit. The in-line acid-dispensing device 420 can draw current through the communication channel 316, while the current limiter 338 can cap the current at a level suitable for the pool controller 324. Example current caps include 20 mA and 25 mA, for example. In some examples, the in-line acid-dispensing device 420 can be configured to allow for a custom cap on the current draw. This current can be used to charge the battery 340, which can be a lithium-ion battery or any other suitable battery.

The power drawn through the current limiter 338 can also be used to power or otherwise communicate with a microcontroller 344. The microcontroller 344 can include a processor configured to execute instructions stored in a nontransitory, computer-readable medium. In one example the microcontroller 344 is primarily powered by the battery 340, but in a scenario where the battery 340 is depleted, the microcontroller 344 can be powered directly from the current drawn through the current limiter 338. The microcontroller 344 can also receive digital signals sent from the pool controller 324 over the communication channel 316. The processor of the microcontroller 344 can be configured to interpret these signals as well as send signals back to the pool controller using the same communication channel 316.

The battery 340 can power a motor driver 342, which can act as an interface between the control circuitry of the acid-dispensing device 328 and an acid pump 336 associated with the device 328. The motor driver 342 can receive a low-current control signal, such as a signal from the microcontroller 344, and transform it into a higher-current signal capable of driving the acid pump 336. The motor driver 342 can utilized stored energy within the battery 340 to provide sufficient power to drive the acid pump 336. When the motor driver 342 has completed an operation, it can remain idle while the battery 340 is trickle charged through the communication channel 316.

The acid pump 336 can interface with at least two lines, also referred to as tubes, configured to carry acid to or from the acid pump 336. In an example, the acid pump 336 includes two fittings, each fitting configured to couple with an acid line. As shown in FIG. 4, one of these acid lines can be a suction line 404 that runs from an external acid tank 402 to the acid pump 336. In this example, the acid tank 402 is located external to the in-line acid-dispensing device 420, but as explained above with respect to FIG. 3, the acid tank 402 can be located within the in-line acid-dispensing device 420.

The other acid line associated with the acid pump 336 can be a pressure line 406 that carries acid pressurized by the acid pump 336. In this example, the pressure line 406 runs from the acid pump 336 to an internal check valve 408. The check valve 408 is configured to allow fluid to flow in only direction, ensuring that water from the main water flow does not enter the acid-dispensing system. The check valve 408 can provide the acid to an acid-dispensing coupling 410 that is contained within the in-line acid-dispensing device 420 and interfaces with the water flow 308 to the pool. In some examples, the check valve 408 and acid-dispensing coupling 410 are combined into a single unit. In other examples, such as that shown in FIG. 4, another line carries acid from the check valve 408 to the acid-dispensing coupling 410.

The example embodiment of FIG. 4 shows the main water line contained within the body of the in-line acid-dispensing device 420, with the acid-dispensing coupling 410 fitted to the main water line. However, in other embodiments, the in-line acid-dispensing device 420 can replace a section of the main water line such that the water flows through the in-line acid-dispensing device 420. Such an example is described below with respect to FIGS. 5-12.

In the example of FIG. 4, the in-line acid-dispensing device 420 can operate entirely off power received through the low-voltage data channel 316. This eliminates the need for a separate connection to a high-voltage power source, allowing for a simplified pool controller 324 that can be updated to control the acid-dispensing system differently through firmware updates. Additionally, the in-line acid-dispensing device 420 can monitor conditions and detect failures and communicate the same to the pool controller 324. Further, the in-line acid-dispensing device 420 minimizes pressure-side tubing, reducing the risk of failures. And because the pressure-side tubing is internal, a failure of the pressure-side tubing has less chance of damaging other pool components in the area such as the controller 324.

Figure 5:
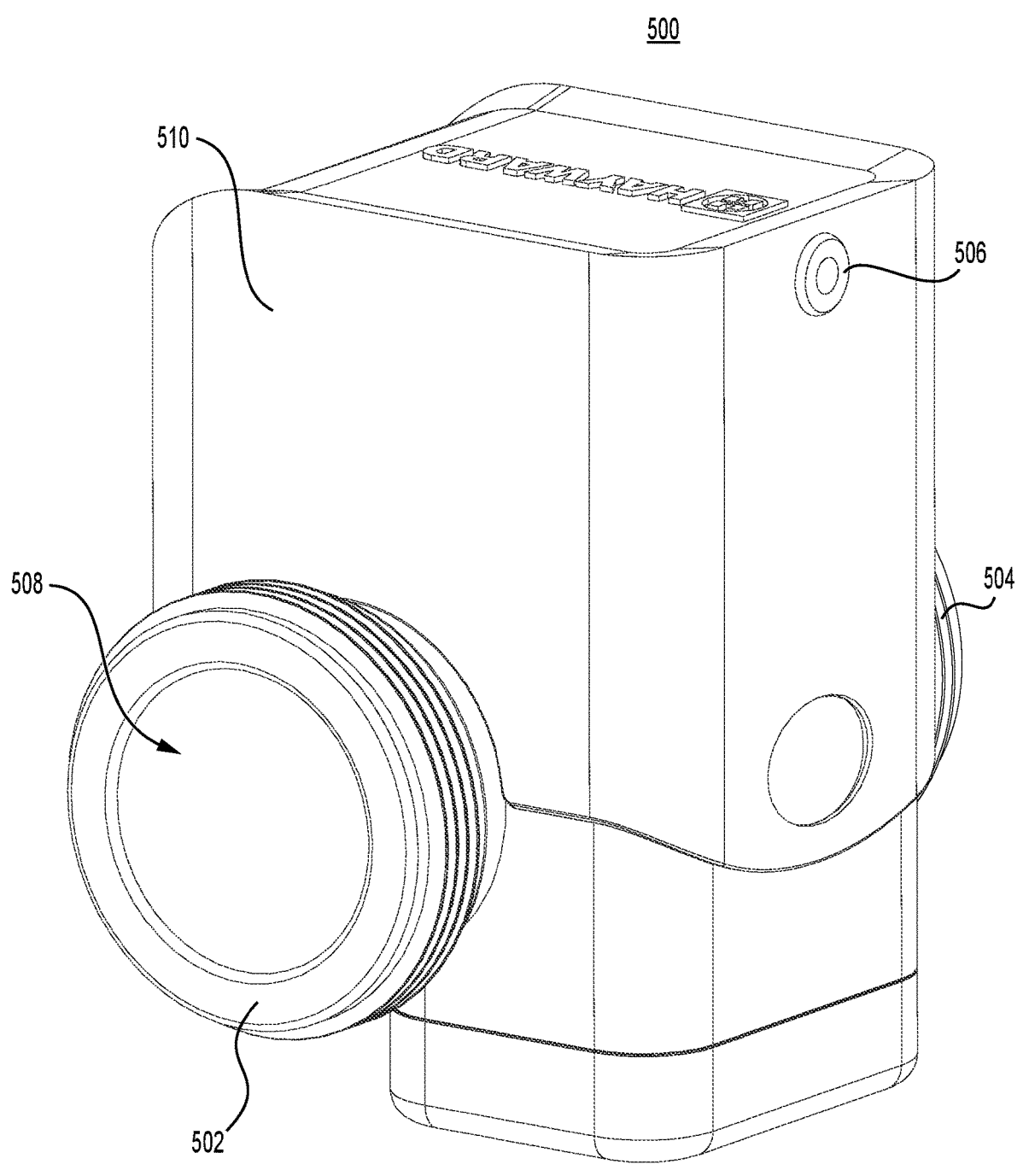
FIG. 5 is a perspective view of an example in-line acid-dispensing device for dispensing acid to a pool.

FIG. 5 is a perspective view of an example in-line acid-dispensing device 500 for dispensing acid to a pool. The in-line acid-dispensing device 500 includes a body portion 510 and an aperture 508 extending through the body portion 510. As explained in more detail with respect to the remaining figures, the body portion 510 can house various components of an acid-dispensing system.

Figure 6:
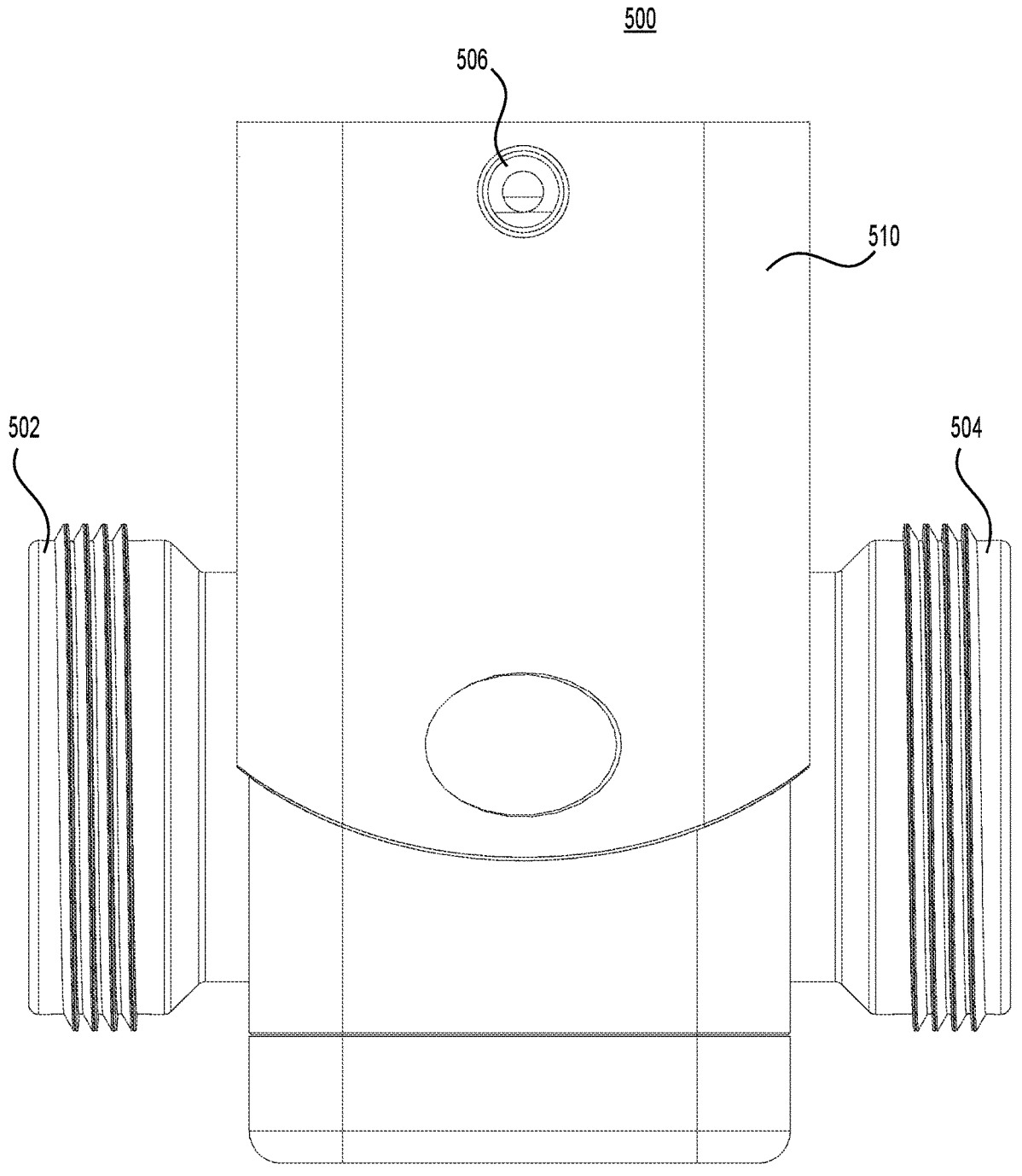
FIG. 6 is a front view of an example in-line acid-dispensing device for dispensing acid to a pool.
Figure 7:
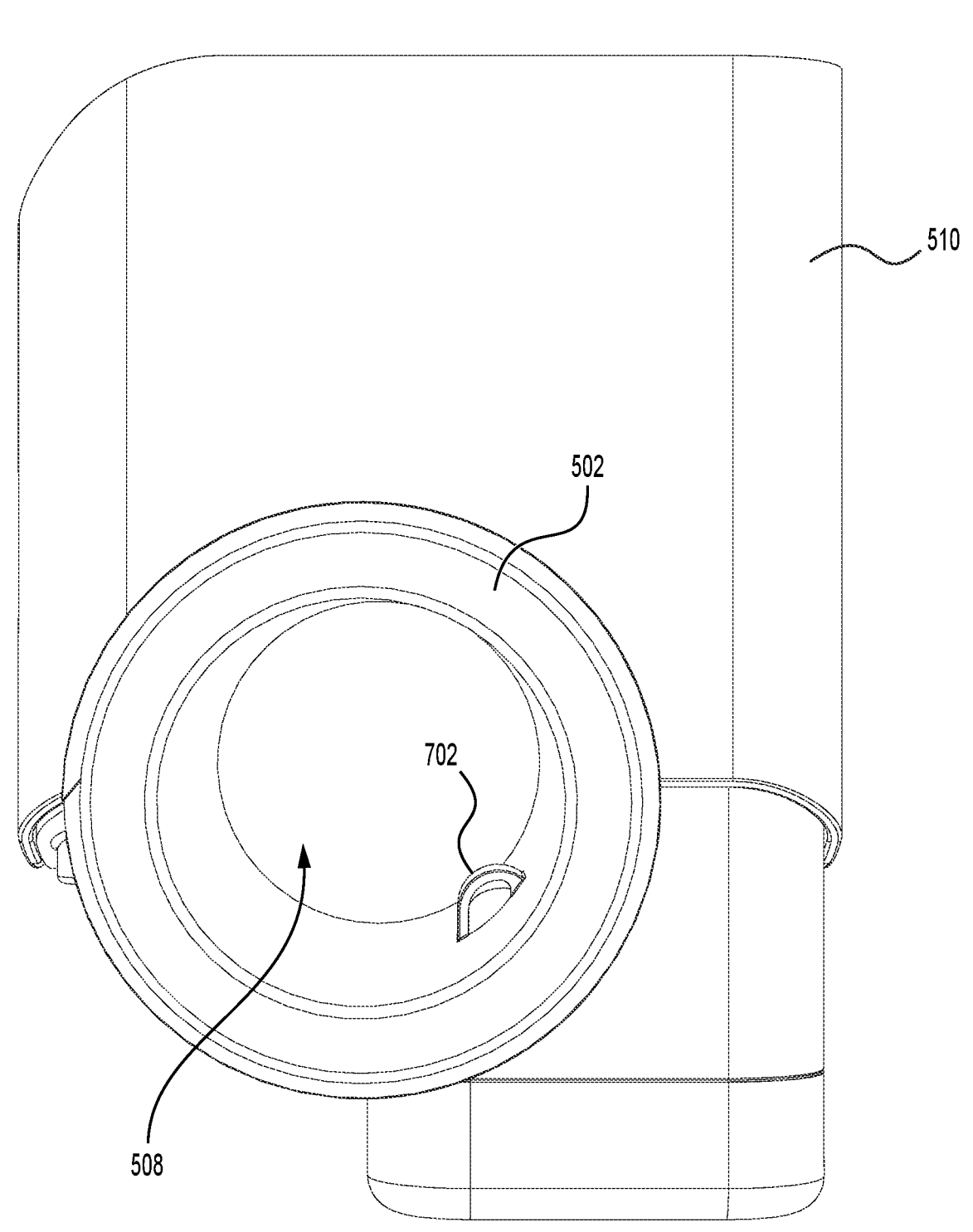
FIG. 7 is a side view of an example in-line acid-dispensing device for dispensing acid to a pool.

As shown in FIG. 5 and further illustrated in FIGS. 6 and 7, the aperture 508 is formed by an inlet 502 and an outlet 504. As shown, the inlet 502 and outlet 504 can each include external threading for coupling a pipe to each side of the in-line acid-dispensing device 500. For example, the inlet 502 and outlet 504 can have an internal diameter that roughly matches the external diameter of a main water line, allowing a user to insert portions of the water line into each of the inlet 502 and outlet 504. These pipes can be secured by installing a fastener with internal threading to each section of pipe and the inlet 502 or outlet 504, respectively.

FIG. 5 also shows an orifice 506 on a face of the body portion 510 that can be configured to receive a suction tube from an external acid tank, such as the suction line 404 depicted in FIG. 4 and described above. The orifice 506 can be shaped to receive a fitting that allows for connecting a suction tube to the fitting, rather than routing the suction tube through the orifice 506 to another component.

FIG. 6 is a front view of the example in-line acid-dispensing device 500 of FIG. 5, showing the same components. FIG. 7 is a side view of the example in-line acid-dispensing device 500 of FIG. 5. The side view shows the aperture 508 running through the entire body portion 510 of the device 500. Although the description herein commonly refers to this aperture as running "through" the body portion 510, in some examples the aperture can be located in a pipe that is adjacently connected, rather than inside, the body portion 510. The same components and methods can apply in that scenario.

FIG. 7 shows a fluid interface 702 located within the aperture 508. The fluid interface can be a protrusion or an orifice that allows fluid from within the aperture 508 to flow in or out of at least some part of the body portion 510. In some examples, the fluid interface 702 can be used to dispense acid into the main water flow, either directly or by mixing with water inside the body portion 510 before being introduced to the main water flow. This is explained further with respect to FIG. 8.

Figure 8:
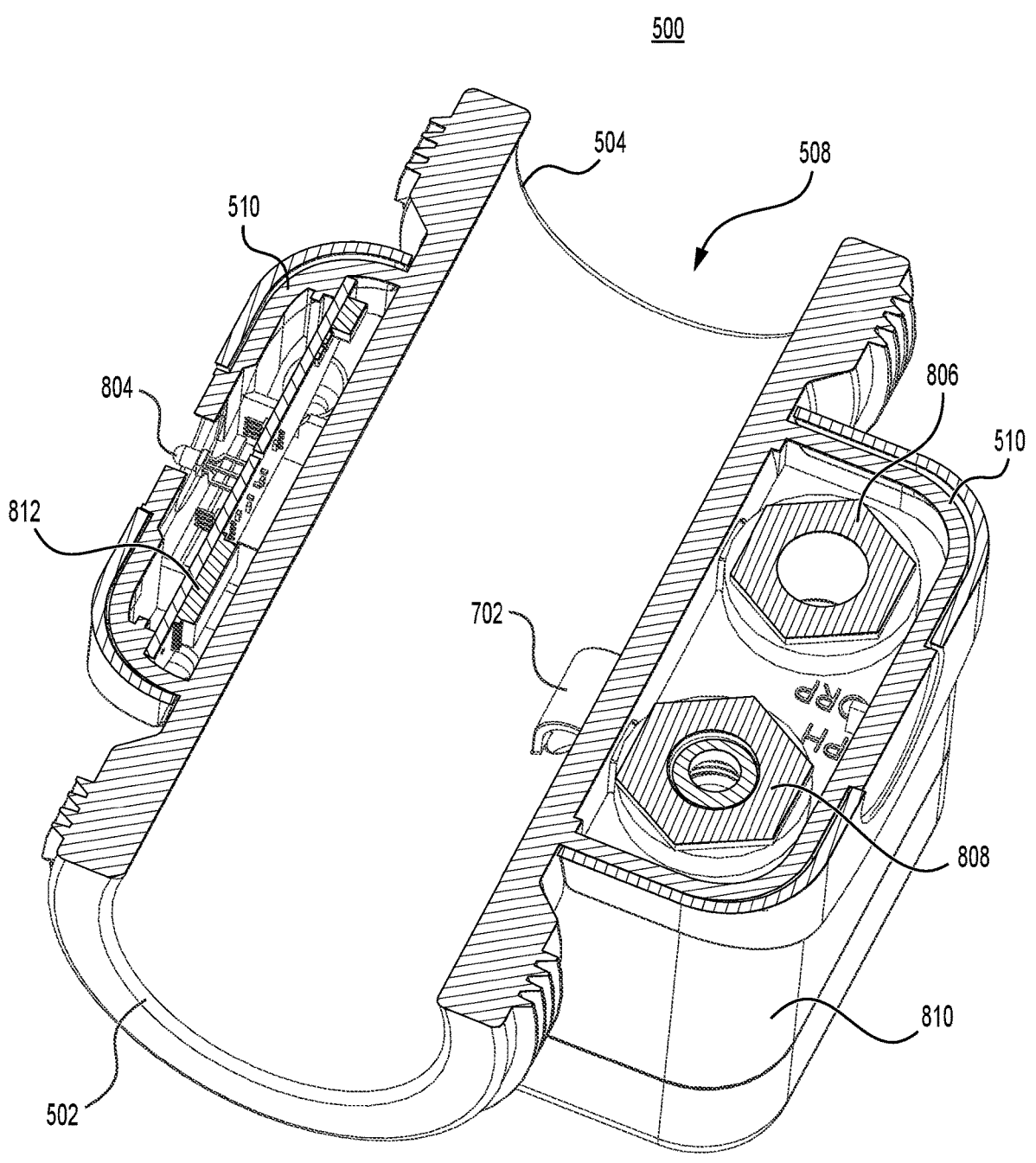
FIG. 8 is a horizontal cross-sectional view of an example in-line acid-dispensing device for dispensing acid to a pool.

FIG. 8 is a horizontal cross-sectional view of the example in-line acid-dispensing device 500 of FIG. 5. As shown in FIG. 8, the fluid interface 702 is located above, or at least adjacent to, an internal tank 810. First and second tank fittings 806, 808 are positioned above the tank 810. In some examples, the tank 810 includes a divider that splits the tank 810 into two tanks, with each tank having an interface with the fluid interface 702. In that example, the two tanks can include a pass-through portion allowing fluid flow between the two.

In some examples, tank fittings 806, 808 are configured to accept one or more sensors for testing the fluid within the tank 810. For example, the fittings 806, 808 can be configured to mount a pH sensor, ORP sensor, or another relevant sensor. In other examples, particularly those where a separate pH/ORP monitor is installed on the pool system such as shown in FIGS. 3 and 4, the fittings 806, 808 can be used for other purposes or plugged. In one example, fitting 806 can be configured to accept a check valve that dispenses acid into the tank 810, where it mixes with fluid in the tank 810. That fluid mixture can then enter the main flow line via the fluid interface 702. This example embodiment is shown in FIGS. 9-12.

FIG. 8 also shows a data port 804 and a microcontroller 812 mounted to a circuit board. The data port 804 can be configured to receive a physical data cable, such as the communication channel 316 described with respect to FIGS. 3 and 4. The microcontroller 812, in turn, can be a physical processor that can receive and interpret any communications received through the data port 804. In some examples, the microcontroller 812 can also be configured to receive communications received wirelessly at the device 500, such as communications received at a wireless-communication module mounted to the circuit board.

The microcontroller 812 can control some or all aspects of the in-line acid-dispensing device 500. For example, it can generate commands that cause an acid pump to start or stop. It can also generate commands to charge, or stop charging, a battery within the device 500. The microcontroller 812 can include, or have access to, a memory storage device located within the device 500. The microcontroller 812 can store or retrieve data from the memory storage as needed. The microcontroller 812 can also be configured to send communications to a pool controller, such as a status update, battery level information, acid-dispensing information, confirmation of dispensing, any other sensor information, or alerts. The microcontroller 812 can format the communications in accordance with an electrical communication standard such as RS-485, for example.

Figure 9:
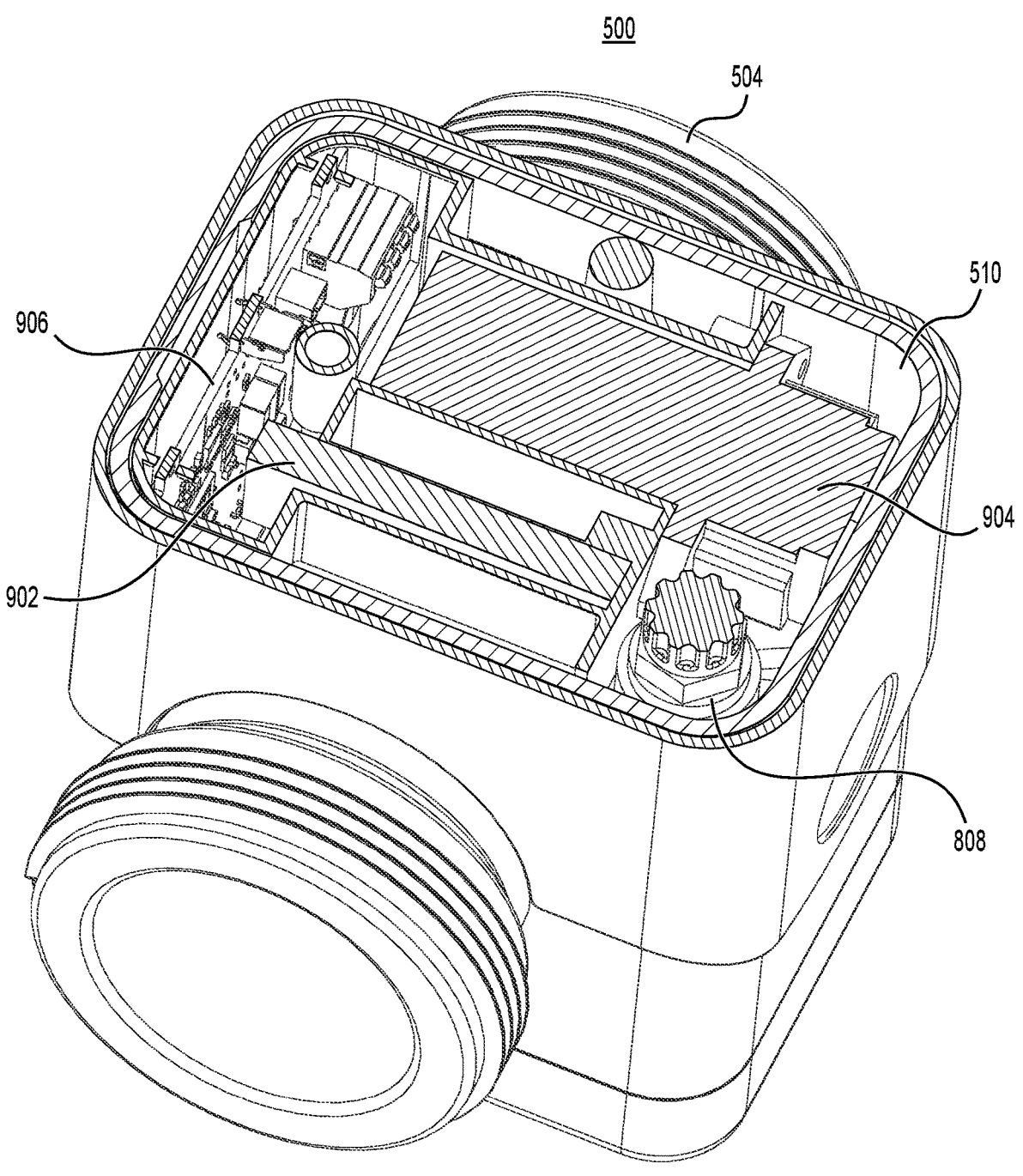
FIG. 9 is a horizontal cross-sectional view of an example in-line acid-dispensing device for dispensing acid to a pool.

FIG. 9 is a horizontal cross-sectional view of the example in-line acid-dispensing device 500 of FIG. 5, showing a similar view as FIG. 8 but located vertically further up the in-line acid-dispensing device 500. In this view, the battery 902 can be seen located proximate to the circuit board 906 that includes the microcontroller 812 described above. The battery 902 can be a lithium-ion battery in an example. As explained above but not called out specifically in this figure, the circuit board 906 can include a current limiter that draws current through a communication channel and uses the current to charge the battery 902.

The battery 902 can use stored energy to power the acid pump 904, which is shown in this cross-sectional view. In an example, the battery 902 powers a motor driver (not shown) that provides sufficient current to the acid pump 904 to draw acid from an acid reservoir and push it through the check valve 808. The input and output locations for the acid pump 904 are shown and described with respect to additional figures below.

Figure 10:
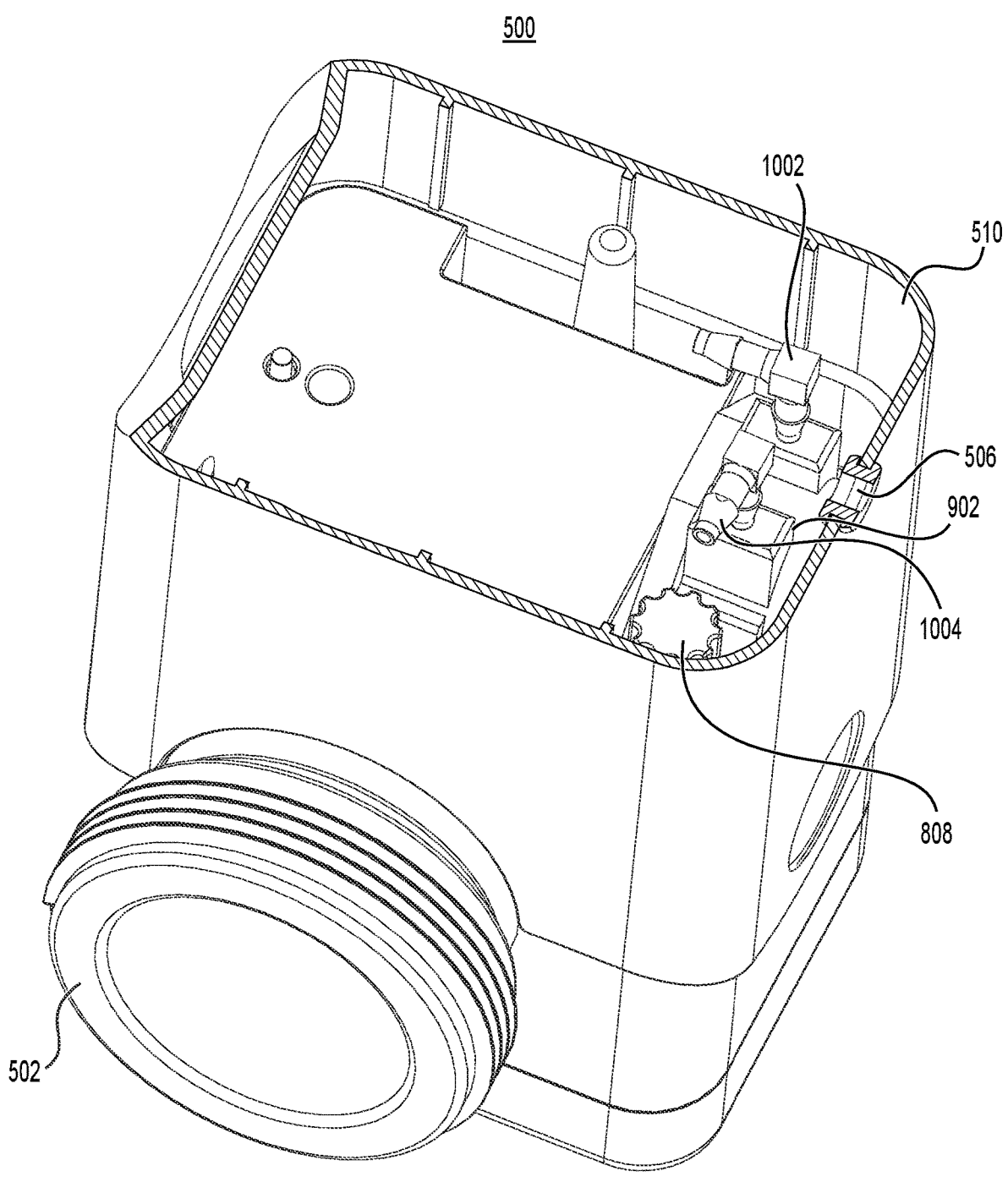
FIG. 10 is a horizontal cross-sectional view of an example in-line acid-dispensing device for dispensing acid to a pool.

FIG. 10 is a horizontal cross-sectional view of an example in-line acid-dispensing device 500 of FIG. 5, showing a similar view as FIGS. 8 and 9 but located vertically further up the in-line acid-dispensing device 500 than either of those figures. This view is intended to show the fittings 1002, 1004 associated with the acid pump 902. Each of these fittings 1002, 1004 can be configured to accept an acid-tubing line, such as the suction and pressure lines 404, 406 shown in FIG. 4. In some examples, the fittings 1002, 1004 and lines are sized for an interference fit (also known as a pressed fit or friction fit). For example, the lines can include an inner diameter slightly smaller than an outer diameter of the fittings 1002, 1004, requiring force to install the lines on the fittings 1002, 1004 and resulting in friction sufficient to prevent the lines from detaching. In other examples, the lines can be installed on the fittings 1002, 1004 with retaining devices such as hose clamps or cable ties. In yet other examples, the lines can include quick-connect fittings that can removably couple to the fittings 1002, 1004 of the acid pump 902.

Figure 13:
FIG. 13 is a horizontal cross-sectional view of an example in-line acid-dispensing device for dispensing acid to a pool

In an example, a suction-side fitting 1002 is connected to a suction tube routed through the body portion 510 of the in-line acid-dispensing device 500, such as routing through the orifice 506 to an external acid tank. In a similar example shown in FIG. 13, the suction line runs from the suction-side fitting 1002 to a fitting installed at the orifice 506. That fitting, in turn, can attach to a second suction tube that runs to an external acid tank. This allows for easier installation, as the external suction line need only be connected to an external fitting at the orifice 506. In an example, the pressure-side fitting 1004 is connected to a pressure tube routed to the check valve 808. This is also shown in FIG. 13.

Figure 11:
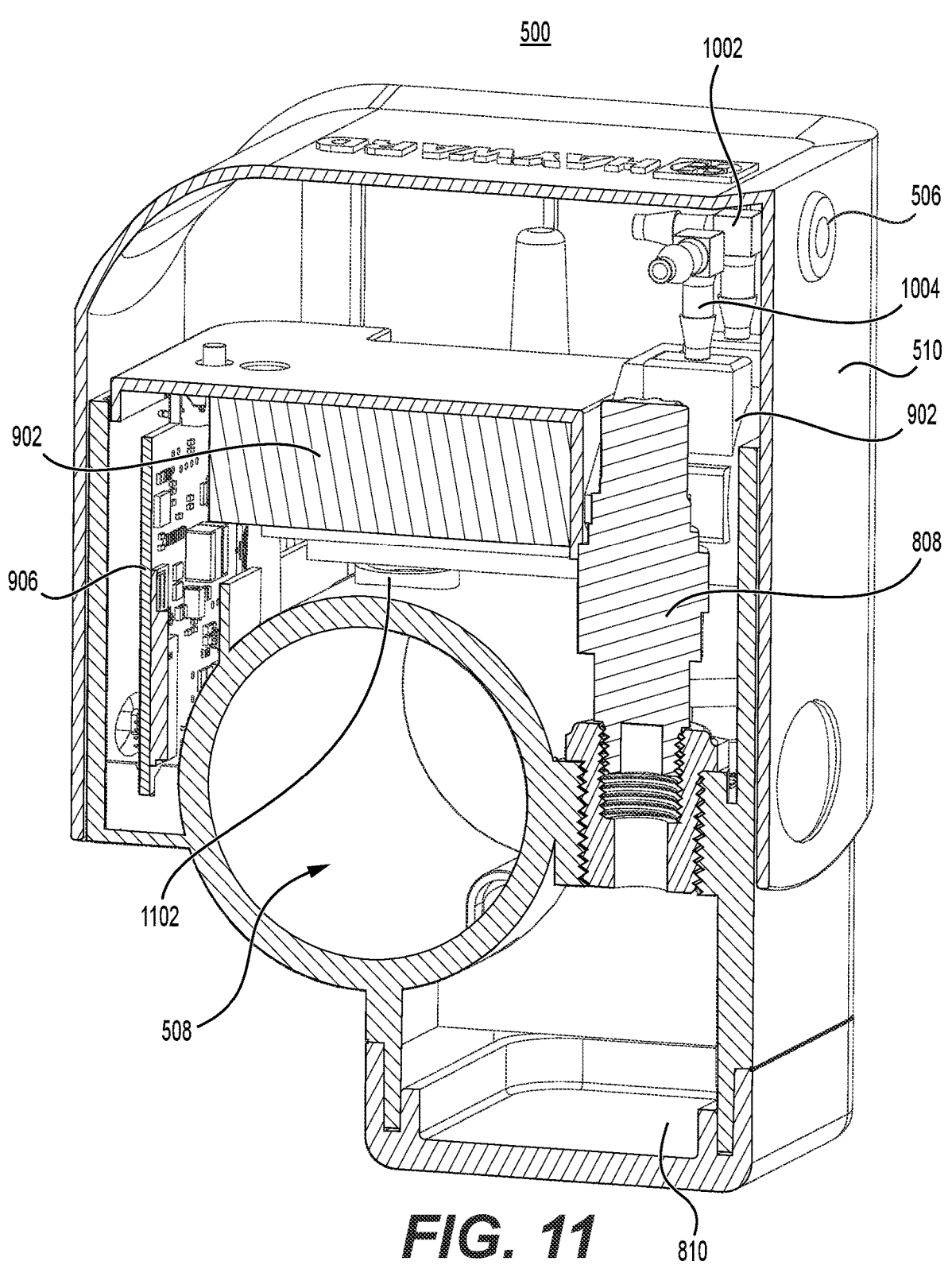
FIG. 11 is a vertical cross-sectional view of an example in-line acid-dispensing device for dispensing acid to a pool.

FIG. 11 is a vertical cross-sectional view of the example in-line acid-dispensing device 500 of FIG. 5, with the cross section drawn through the approximate center of the check

Figure 12:
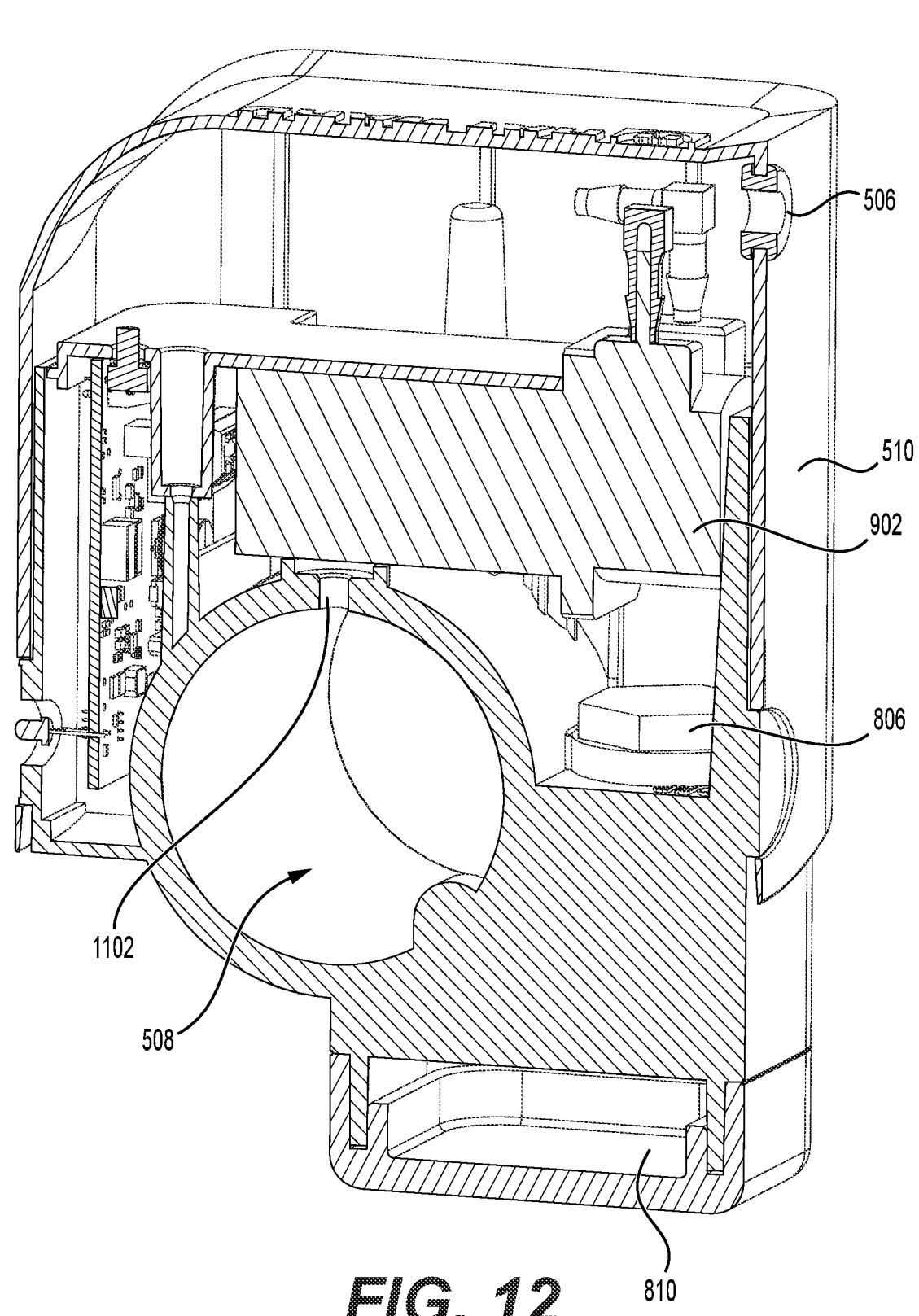
FIG. 12 is a vertical cross-sectional view of an example in-line acid-dispensing device for dispensing acid to a pool.

15 valve 808. This view shows various components discussed above, such that acid pump 902, pump fittings 1002, 1004, battery 902, circuit board 906, internal tank 810, and aperture 508 for water flow. In this figure, an additional port 1102 is shown. This port 1102 can provide another fluid interface with the fluid flowing through the aperture 508 that can optionally be used for various functions. FIG. 12 provides a vertical cross-sectional view of the example in-line acid-dispensing device 500, with the cross section drawn through the approximate center of the port 1102.

The port 1102 can be used to house a sensor, such as a flow sensor that determines whether fluid is flowing through the aperture 508. In some examples, the flow sensor is a pressure sensor that measures the pressure of the fluid, which can provide an indication of whether the fluid is flowing or not. The sensor can be configured to communication with the microcontroller 812, allowing the microcontroller 812 to enforce rules for discharging acid. For example, if the water in the aperture 508 is not flowing, based on information provided from a sensor at the port 1102, then the microcontroller 812 can pause or cancel an acid-dispensing action.

In some embodiments, the port 1102 can be used as a location to discharge acid into the main flow rather than, or in addition to, using the internal tank 810 as described above. In that example, a pressure line can run from the acid pump 902 to the port 1102.

FIG. 13 provides a horizontal cross-sectional view of an example in-line acid-dispensing device similar to those shown in FIGS. 5-12 but showing additional components. In particular, the device of FIG. 13 shows an internal suction line 1302 running from an internal acid pump to an internal body fitting 1306, in the manner described above. The internal body fitting 1306 can interface with an external body fitting 1308 configured to attach a suction line running to an external acid tank. Similarly, a pressure line 1304 is shown that carries pressurized acid from the internal acid pump to the check valve.

In addition, FIG. 13 shows pipe sections connected to the device such that fluid can flow through the device, as described above. FIG. 13 also shows pipe couplings 1310, 1312 that can be used to install the pipe sections to the device and prevent leakage. These couplings 1310, 1312 can include internal threading configured to mate with external threading on the inlet 502 and outlet 504 of device 500 shown in FIG. 5, for example. In addition, these couplings 1310, 1312 can be used to carry out stages 220 and 230 of the method of FIG. 2, which relate to installing flow pipes on the inlet and outlet of an acid-dispensing device.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

16

What is claimed is:

1. A method for dispensing acid from an acid-dispensing device, the method comprising:
    drawing electrical current at the device through a data channel, wherein the electrical current is used to charge a battery of the device;
    receiving at the device, through the data channel, a digital signal instructing the device to dispense acid; and
    dispensing the acid based on receiving the digital signal, wherein said dispensing comprises powering a pump using energy stored in the battery.

2. The method of claim 1, wherein the digital signal is received directly from a controller configured to provide the digital signal through the data channel.

3. The method of claim 1, wherein the acid-dispensing device confirms water flow to a pool before dispensing the acid.

4. The method of claim 1, wherein said drawing electrical current at the acid-dispensing device comprises limiting a current draw to a threshold level configured for the data channel.

5. The method of claim 1, further comprising sending to a controller, using the data channel, an indication of a liquid level in an acid tank coupled to the acid-dispensing device.

6. The method of claim 1, further comprising storing, in a memory storage of the acid-dispensing device, historical information indicating an amount of the acid dispensed since the last refill of an acid tank coupled to the acid-dispensing device.

7. The method of claim 1, wherein receiving the digital signal instructing the device to dispense the acid further comprises the acid-dispensing device authenticating the digital signal using an encryption key stored at the acid-dispensing device.

8. The method of claim 1, wherein the digital signal instructing the device to dispense the acid includes an indication of an amount of the acid to be dispensed by the acid-dispensing device.

9. The method of claim 1, wherein said dispensing the acid further comprises operating at least one of a stepper motor, a brushed DC motor, and a brushless motor using energy stored in the battery.

10. The method of claim 1, further comprising detecting an error by the acid-dispensing device and alerting the controller by sending an alert over the data channel from the acid-dispensing device to the controller.

11. A method for dispensing acid, comprising:
    providing an acid-dispensing device comprising:
    a battery;
    a pump configured to draw acid from an acid reservoir using power from the battery;
    a memory storage including a non-transitory, computer-readable medium comprising operating instructions; and
    a processor;
    drawing electrical current at the device through a data channel, wherein the electrical current is used to charge the battery;
    receiving at the device, through the data channel, a digital signal instructing the device to dispense acid; and
    dispensing the acid based on receiving the digital signal, wherein said dispensing comprises powering a pump using energy stored in the battery.

12. The method of claim 11, wherein the digital signal is received directly from a controller configured to provide a digital signal through the data channel.

13. The method of claim 11, wherein the acid-dispensing device confirms water flow to a pool before discharging the acid.

14. The method of claim 11, wherein said drawing electrical current at the acid-dispensing device comprises limiting a current draw to a threshold level configured for the data channel.

15. The method of claim 11, further comprising sending to a controller, using the data channel, an indication of a liquid level in an acid tank coupled to the acid-dispensing device.

16. The method of claim 11, further comprising storing, in the memory storage of the acid-dispensing device, historical information indicating an amount of the acid dispensed since the last refill of an acid tank coupled to the acid-dispensing device.

17. The method of claim 11, wherein receiving the digital signal instructing the device to dispense the acid further comprises the acid-dispensing device authenticating the digital signal using an encryption key stored at the acid-dispensing device.

18. The method of claim 11, wherein the digital signal instructing the device to dispense the acid includes an indication of an amount of acid to be dispensed by the acid-dispensing device.

19. The method of claim 11, wherein said dispensing acid further comprises operating at least one of a stepper motor, a brushed DC motor, and a brushless motor using energy stored in the battery.

20. The method of claim 11, further comprising detecting an error by the acid-dispensing device and alerting the controller by sending an alert over the data channel from the acid-dispensing device to the controller.

* * * * *